United States Patent Office 3,712,914
Patented Jan. 23, 1973

3,712,914
ARYLIDENE SEMICARBIZIDES
Harry Tilles, El Cerrito, Calif., assignor to Stauffer
Chemical Company, New York, N.Y.
No Drawing. Original application Nov. 5, 1968, Ser. No.
773,657. Divided and this application May 14, 1970,
Ser. No. 48,732
Int. Cl. C07c 125/06
U.S. Cl. 260—479 C                                    7 Claims

ABSTRACT OF THE DISCLOSURE

Substituted-arylidene semicarbizide compounds having the formula:

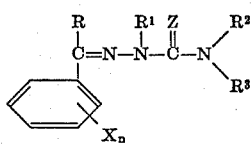

in which Z represents oxygen or sulfur; X represents halogen, lower alkoxy, lower alkyl, hydroxyl, nitro, cyano, N-allylcarbamoyloxy, lower-dialkylthiophosphoryloxy, N-lower alkylcarbamoyloxy, lower dialkylamino, or $(CH_3)_3N^+I^-$; $n$ represents an integer of from 0 to 3, inclusive; R represents hydrogen or lower alkyl; $R^1$ represents hydrogen or lower alkyl; $R^2$ represents hydrogen, lower alkyl or allyl; $R^3$ represents hydrogen, alkyl, allyl, furfuryl, tetrahydrofurfuryl, lower alkoxy lower alkyl, cyclohexyl, 2-chloroallyl, phenyl, benzyl, or substituted-phenyl in which the substituents are chloro or nitro; $R^2$ and $R^3$ when taken together represent an alkylene containing 4 to 6 carbon atoms, inclusive, or lower alkyl substituted alkylene containing 5 to 8 carbon atoms, inclusive. The compounds are useful as herbicides.

---

This application is a division of copending application Ser. No. 773,657 filed Nov. 5, 1968, now abandoned.

This invention relates to certain novel substituted-arylidene semicarbizide compounds which are useful as herbicides. The compounds of the present invention are new compositions of matter and correspond to the formula:

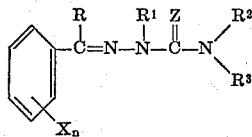

in which Z is oxygen or sulfur; X is halogen, lower alkoxy, lower alkyl, hydroxyl, nitro, cyano, N-lower alkylcarbamoyloxy, N-allylcarbamoyloxy, lower dialkylamino, lower dialkylthiophosphoryloxy or $(CH_3)_3N^+I^-$; $n$ is an integer of from 0 to 3, inclusive; R is hydrogen or lower alkyl; $R^1$ is hydrogen or lower alkyl; $R^2$ is hydrogen, lower alkyl or allyl; $R^3$ is hydrogen, lower alkyl, allyl, furfuryl, tetrahydrofurfuryl, lower alkoxy lower alkyl, cyclohexyl, 2-chloroallyl, phenyl, benzyl or substituted-phenyl in which said substituents are chloro or nitro; $R^2$ and $R^3$ when taken together is alkylene containing 4 to 6 carbon atoms, inclusive, or lower alkyl-substituted alkylene containing a total of 5 to 8 carbon atoms, inclusive.

In the above description, the following preferred embodiments are intended for the various groups: lower alkyl preferably includes, unless otherwise provided for, those members which contain from 1 to about 6 carbon atoms, inclusive, in both straight chain and branched chain configurations, for example, methyl, ethyl, n-propyl, isopropyl, n-butyl, sec.-butyl, amyl, isoamyl, n-hexyl, isohexyl, and the like; lower alkoxy preferably includes those members which contain from 1 to about 4 carbon atoms, inclusive, in both straight chain and branched chain configurations, for example, methoxy, ethoxy, n-propoxy, isopropoxy, n-butoxy, sec.-butoxy and isobutoxy; the term halogen preferably includes fluorine, chlorine, bromine and iodine. When the term lower alkyl appears as a substituent in a group, such as lower alkyl carbamoyloxy and lower dialkylamino, the term preferably includes those lower alkyl members which contain from 1 to about 4 carbon atoms, inclusive, in both straight chain and branched chain configurations; and lower alkoxy lower alkyl preferably includes those members which contain a total of not more than 6 carbon atoms, for example, methoxymethyl, methoxyethyl, ethoxymethyl, methoxypropyl, ethoxypropyl, propoxypropyl, ethoxybutyl, methoxyamyl, and the like. Z is defined as oxygen or sulfur, preferably oxygen.

The compounds of this invention have been found to be active herbicides of a general type. That is, certain members of the class have been found to be herbicidally effective against a wide range of plant species. The method of controlling undesirable vegetation of the present invention comprises applying an herbicidally effective amount of the above-described compounds to the area where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing retardation, defoliation, desiccation, regulation, stunting, tillering, stimulation, dwarfing and the like. By "plants" it is meant germinant seeds, emerging seedlings, and established vegetation including the roots and above-ground portions.

The compounds of the present invention are prepared by several different methods depending upon the nature of the starting materials and the products desired. The following general schemes illustrate the various synthesis routes that can be used for preparing the subject compounds.

(A) 1-arylidene-4-mono or disubstituted semicarbizides.

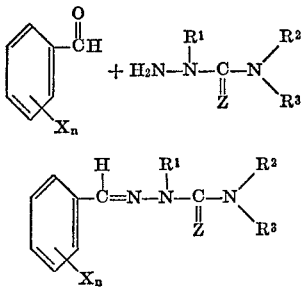

(B) 1-arylidene-4-monosubstituted semicarbizides.

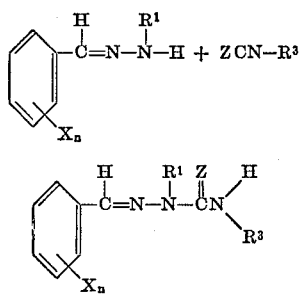

(C) 1-arylidene-4-mono disubstituted semicarbizides.

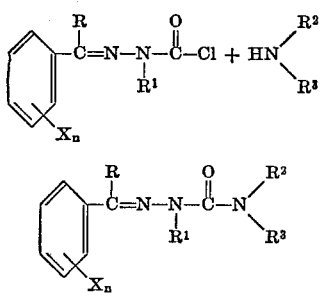

Wherein Z, X, $n$, R, $R^1$, $R^2$, and $R^3$ are as previously defined.

Generally, the reactions are performed in a suitable solvent, such as benzene, diethyl, ether, acetone and the like. Where the condensation involves elimination of a hydrogen halide, such as in route (C) supra, a suitable acid acceptor, such as triethylamine, is used as a catalyst. Where water is eliminated, such as in route (A) supra, a catalyst, such as 2-naphthalenesulfonic acid, is employed. After the reaction is completed the solvent is removed on the product extracted therefrom. Upon recovery of the crude product final recovery is by normal workup procedures, such as recrystallization or distillation.

Preparation of the compounds of the present invention are prepared by the following more particularly illustrated examples. Following the examples is a table of compounds which are prepared according to the procedures described herein.

EXAMPLE 1

Preparation of 1-benzylidene-2-methyl-4-isopropyl-semicarbizide

A 500 cc. four-necked flask is provided with a stirrer, thermometer, condenser and a Dean-Stark water azeotrope apparatus. A mixture of 10.6 g. (0.10 mole) of benzaldehyde, 13.1 g. (0.10 mole) of 2-methyl-4-isopropyl-semicarbizide, 0.3 g. of 2-naphthalenesulfonic acid and 100 cc. of benzene is charged to the flask. The mixture is heated to reflux with stirring and is refluxed for two hours until no more water is azeotroped. The reaction mixture is then cooled to room temperature, washed with four 50 cc. portions of water, dried over anhydrous magnesium sulfate and concentrated in the rotary evaporator under reduced pressure. On cooling to room temperature, the residual liquid crystallizes. It is slurried with 50 cc. of n-pentane for a few minutes, filtered and dried. There is obtained 15.1 g. (68.9% yield) of the title compound, M.P. 81.5–83.0 C.

Analysis.—Calculated for $C_{12}H_{17}N_3O$ (percent): C, 65.72; H, 7.81. Found (percent): C, 66.01; H, 7.87.

EXAMPLE II

Preparation of 1-(p-methylbenzylidene)-2-methyl-4-t-butylsemicarbizide

Para-tolualdehyde methylhydrazone, 10.4 g. (0.07 mole) is dissolved in 25 cc. of anhydrous diethyl ether and 8.3 g. (0.084 mole) of t-butyl isocyanate is added. The reaction mixture is allowed to stand at room temperature for 20 hours and is concentrated under reduced pressure. The residual viscous liquid, 15.9 g., is induced to crystallize by scratching and is recrystallized from hexane and filtered after cooling the mixture in Dry Ice. There is obtained 6.0 g. (34.7% yield) of the title compound, M.P. 77–80° C.

Analysis.—Calculated for $C_{14}H_{21}NSO$ (percent): C, 67.98; H, 8.56. Found (percent): C, 67.71; H, 8.29.

EXAMPLE III

Preparation of 1-(o-chlorobenzylidene)-2-methyl-4-isobutylsemicarbizide

A 500 cc. four-necked flask is provided with stirrer, thermometer, condenser and addition funnel. To the flask is added 11.6 g. (0.05 mole) of chloroformic acid, (o-chlorobenzylidene)methylhydrazide and 100 cc. of benzene. A mixture of 4.0 g. (0.055 mole) of isobutylamine and 5.6 g. (0.055 mole) of triethylamine is added dropwise to the flask over an interval of 5 minutes while cooling with ice and the temperature is maintained between 22–26° C. The mixture is then brought to reflux and held at reflux for 20 minutes. The mixture is cooled, filtered from triethylamine hydrochloride, the cake washed with four 25 cc. portions of benzene and the washings are combined with the original benzene filtrate. The combined benzene filtrate is washed with four 50 cc. portions of water, dried over anhydrous magnesium sulfate, filtered and concentrated under reduced pressure. There is obtained 11.9 g. (88.8% yield) of the title compound, M.P. 98.0–100.5° C.

Analysis.—Calculated for $C_{13}H_{18}C_1N_3O$ (percent): C, 58.31; H, 6.78. Found (percent): C, 58.48; H, 6.92.

EXAMPLE IV

Preparation of 1-(3'-ethylcarbamoyloxybenzylidene)-2-methyl-4-isopropylsemicarbizides A 100 cc. three-necked flask is provided with stirrer, thermometer and condenser containing a drying tube filled with drying agent connected to its top. To the flask is charged 11.8 g. (0.05 mole) of 1-(3'-hydroxybenzylidene) 2-methyl-4-isopropylsemicarbizide, 50 cc. of anhydrous acetone and 5 drops of triethylamine. To this mixture is charged 5.3 g. of ethyl isocyanate. The mixture is then refluxed for 3 hours, cooled and concentrated under reduced pressure. The residual solid is washed with four 50 cc. portions of water and dried. There is obtained 14.8 g. (96.7% yield) of the title compound, M.P. 143.0–144.5° C.

Analysis.—Calculated for $C_{15}H_{22}N_4O_3$ (percent): C, 58.80; H, 7.24. Found (percent): C, 58.93; H, 7.51.

TABLE I

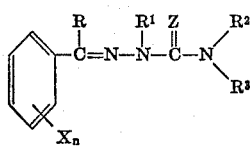

| Compound Number | $X_n$ | R | $R^1$ | Z | $R^2$ | $R^3$ | M.P.(° C.) $n_D^{30}$ |
|---|---|---|---|---|---|---|---|
| 1 | 4-Cl | H | $CH_3$ | O | H | $CH_3$ | 161.5–164.5 |
| 2 | 4-$CH_3$ | H | $CH_3$ | O | H | n-$C_4H_9$ | 89–90 |
| 3 | 4-$CH_3$ | H | $CH_3$ | O | H | t-$C_4H_9$ | 77–80 |
| 4 | 4-$CH_3$ | H | $CH_3$ | O | H | $CH_3$ | 114–116 |
| 5 | 4-$CH_3$ | H | $CH_3$ | O | H | —C₆H₄—Cl | 135–136 |
| 6 | 4-$CH_3$ | H | $CH_3$ | O | H | —C₆H₅ | 129.0–130.0 |
| 7 | 4-$CH_3$ | H | $CH_3$ | O | H | $C_2H_5$ | 113.0–115.5 |
| 8 | H | H | $CH_3$ | O | H | t-$C_4H_9$ | 1.5560 |
| 9 | 4-Cl | H | $CH_3$ | O | H | t-$C_4H_9$ | 103.5–105.5 |
| 10 | 2-Cl | H | $CH_3$ | O | H | t-$C_4H_9$ | 85.0–87.5 |
| 11 | 3,4-Cl | H | $CH_3$ | O | H | t-$C_4H_9$ | 109–111.5 |
| 12 | 3-$NO_2$ | H | $CH_3$ | O | H | t-$C_4H_9$ | 161.5–164.0 |
| 13 | 2,4-Cl | H | $CH_3$ | O | H | t-$C_4H_9$ | 117.5–119.5 |
| 14 | 4-$CH_3O$ | H | $CH_3$ | O | H | t-$C_4H_9$ | 93.5–96.0 |
| 15 | 3,4-$CH_3O$ | H | $CH_3$ | O | H | t-$C_4H_9$ | 105.0–106.5 |
| 16 | 3-$CH_3NHCO_2$ | H | $CH_3$ | O | H | t-$C_4H_9$ | (Glass) |
| 17 | $(C_2H_5O)_2P(S)O$ | H | $CH_3$ | O | H | t-$C_4H_9$ | 1.5480 |
| 18 | H | H | H | O | H | t-$C_4H_9$ | 163–164 |
| 19 | 4-$CH_3$ | H | H | O | H | t-$C_4H_9$ | 189–190.5 |
| 20 | 4-Cl | H | H | O | H | t-$C_4H_9$ | 192.5–194.0 |
| 21 | 2-Cl | H | H | O | H | t-$C_4H_9$ | 175–176 |
| 22 | 3,4-Cl | H | H | O | H | t-$C_4H_9$ | 208.0–209.5 |
| 23 | 3-$NO_2$ | H | H | O | H | t-$C_4H_9$ | 224.5–225.5 |
| 24 | 4-$CH_3O$ | H | H | O | H | t-$C_4H_9$ | 162.5–163.5 |
| 25 | H | H | H | O | H | i-$C_3H_7$ | 136.5–138.0 |
| 26 | 3,4-$CH_3O$ | H | H | O | H | t-$C_4H_9$ | 108–112 |
| 27 | 3-OH | H | H | O | H | t-$C_4H_9$ | 196.5–197.5 |
| 28 | 3-$CH_3NHCO_2$ | H | H | O | H | t-$C_4H_9$ | 151–154 |
| 29 | 3-$C_2H_5NHCO_2$ | H | $CH_2$ | O | H | t-$C_4H_9$ | (Glass) |
| 30 | 3-$C_4H_9NHCO_2$ | H | $CH_3$ | O | H | t-$C_4H_9$ | (Glass) |
| 31 | 3-$C_2H_5NHCO_2$ | H | H | O | H | t-$C_4H_9$ | 175.0–176.5 |
| 32 | 3-$C_3H_7NHCO_2$ | H | H | O | H | t-$C_4H_9$ | 189.5–190.5 |
| 33 | 3-$C_4H_9NHCO_2$ | H | H | O | H | t-$C_4H_9$ | 158.5–160.0 |
| 34 | 3-$CH_2=CHCH_2NHCO_2$ | H | H | O | H | t-$C_4H_9$ | 167.0–168.5 |
| 35 | H | H | $CH_3$ | O | H | i-$C_3H_7$ | 81.5–83.0 |
| 36 | 4-$CH_3$ | H | $CH_3$ | O | H | i-$C_3H_7$ | 65–69 |
| 37 | 4-Cl | H | $CH_3$ | O | H | i-$C_3H_7$ | 113.5–115 |
| 38 | 2-Cl | H | $CH_3$ | O | H | i-$C_3H_7$ | 113–114 |
| 39 | 3,4-Cl | H | $CH_3$ | O | H | i-$C_3H_7$ | 100–102 |
| 40 | 2,4-Cl | H | $CH_3$ | O | H | i-$C_3H_7$ | 141.5–142.5 |
| 41 | 3-$NO_2$ | H | $CH_3$ | O | H | i-$C_3H_7$ | 126.0–127.5 |
| 42 | 4-$CH_3O$ | H | $CH_3$ | O | H | i-$C_3H_7$ | 1.5822 |
| 43 | 3,4-$CH_3O$ | H | $CH_3$ | O | H | i-$C_3H_7$ | 102.5–104 |
| 44 | H | H | $CH_3$ | O | $CH_3$ | $CH_3$ | 1.5887 |
| 45 | 3-OH | H | $CH_3$ | O | H | i-$C_3H_7$ | 121.0–124.5 |
| 46 | 4-$(CH_3)_2N$ | H | $CH_3$ | O | H | i-$C_3H_7$ | 113–116 |
| 47 | 2-$CH_3O$ | H | $CH_3$ | O | H | t-$C_4H_9$ | 88.0–89.5 |
| 48 | 4-$(CH_3)_2N$ | H | $CH_3$ | O | H | i-$C_3H_7$ | 158–160 |
| 49 | 2-$CH_3O$ | H | $CH_3$ | O | H | i-$C_3H_7$ | 109.5–111.0 |
| 50 | 3-Cl | H | $CH_3$ | O | H | t-$C_4H_9$ | 1.569 |
| 51 | 3-Cl | H | $CH_3$ | O | H | i-$C_3H_7$ | 91–94 |
| 52 | 4-$CH_3$ | H | H | O | H | i-$C_3H_7$ | 151.0–152.0 |
| 53 | 2-Cl | H | H | O | H | i-$C_3H_7$ | 163.5–166.5 |
| 54 | 4-Cl | H | H | O | H | i-$C_3H_7$ | 191–193 |
| 55 | 3,4-Cl | H | H | O | H | i-$C_3H_7$ | 177.5–179.0 |
| 56 | 2,4-Cl | H | H | O | H | i-$C_3H_7$ | 147.5–149.0 |
| 57 | 3-$NO_2$ | H | H | O | H | i-$C_3H_7$ | 191–193 |
| 58 | 4-$CH_3O$ | H | H | O | H | i-$C_3H_7$ | 144.5–146.0 |
| 59 | 2-$CH_3O$ | H | H | O | H | i-$C_3H_7$ | 140.5–143.0 |
| 60 | 3,4-$CH_3O$ | H | H | O | H | i-$C_3H_7$ | 160–162 |
| 61 | H | H | $CH_3$ | O | $C_2H_5$ | $C_2H_5$ | 1.5690 |
| 62 | 2,6-Cl | H | $CH_3$ | O | H | i-$C_3H_7$ | 49–53 |
| 63 | 2,6-Cl | H | $CH_3$ | O | H | t-$C_4H_9$ | 104.5–106.5 |
| 64 | 3-$CH_3NHCO_2$ | H | $CH_3$ | O | H | i-$C_3H_7$ | 149.5–151.5 |
| 65 | 3-$C_2H_5NHCO_2$ | H | $CH_3$ | O | H | i-$C_3H_7$ | 143–144.5 |
| 66 | 3-$C_3H_7NHCO_2$ | H | $CH_3$ | O | H | i-$C_3H_7$ | 130.5–132.0 |
| 67 | 3-$C_4H_9NHCO_2$ | H | $CH_3$ | O | H | i-$C_3H_7$ | 126.5–128.5 |
| 68 | 2-Cl | H | $CH_3$ | O | H | $C_2H_5$ | 98.0–99.5 |
| 69 | 2-Cl | H | $CH_3$ | O | H | $CH_3$ | 128.5–130 |
| 70 | 2-Cl | H | $CH_3$ | O | H | n-$C_3H_7$ | 83.0–85.0 |
| 71 | 2-Cl | H | $CH_3$ | O | H | n-$C_4H_9$ | 88.5–89.5 |
| 72 | 2-Cl | H | $CH_3$ | O | H | $CH_2CH=CH_2$ | 81.5–83.0 |
| 73 | 2-Cl | H | $CH_3$ | O | H | —C₆H₅ | 95–98 |

TABLE I—Continued

| Compound Number | $X_n$ | R | $R^1$ | Z | $R^2$ | $R^3$ | M.P. (° C.) $n_D^{30}$ |
|---|---|---|---|---|---|---|---|
| 74 | 2-Cl | H | CH₃ | O | H | 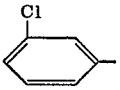 Cl-phenyl | 130.5-133.0 |
| 75 | 2-Cl | H | n-C₄H₉ | O | H | i-C₃H₇ | 64.5-67.5 |
| 76 | 2-Cl | H | n-C₄H₉ | O | H | t-C₄H₉ | 56-60 |
| 77 | 2-Cl | H | n-C₄H₉ | O | H | CH₃ | 57.5-59.5 |
| 78 | 2-Cl | H | n-C₄H₉ | O | H | C₂H₅ | 56-58 |
| 79 | 2-CH₃ | H | CH₃ | O | H | i-C₃H₇ | 95-97 |
| 80 | 2-CH₃ | H | CH₃ | O | H | t-C₄H₉ | 94-97 |
| 81 | 2-Br | H | CH₃ | O | H | i-C₃H₇ | 108-110 |
| 82 | 2-Br | H | CH₃ | O | H | t-C₄H₉ | 108.5-111 |
| 83 | 2-Cl | H | CH₃ | O | H | 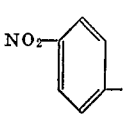 NO₂-phenyl | 210-211.5 |
| 84 | 4-CH₃ | H | CH₃ | O | CH₃ | CH₃ | 81.5-84.5 |
| 85 | 4-Cl | H | CH₃ | O | CH₃ | CH₃ | 68.5-71.5 |
| 86 | 2-Cl | H | CH₃ | O | CH₃ | CH₃ | 84.5-85.5 |
| 87 | 2,6-Cl | H | CH₃ | O | CH₃ | CH₃ | 54.0-55.5 |
| 88 | 3,4-Cl | H | CH₃ | O | CH₃ | CH₃ | 105.5-107.0 |
| 89 | 2,4-Cl | H | CH₃ | O | CH₃ | CH₃ | 56.5-59.0 |
| 90 | 2-CH₃O | H | CH₃ | O | CH₃ | CH₃ | 74.5-76.5 |
| 91 | 4-CH₃O | H | CH₃ | O | CH₃ | CH₃ | 78.5-79.5 |
| 92 | 3,4-CH₃O | H | CH₃ | O | CH₃ | CH₃ | (a) |
| 93 | 2,5-CH₃O | H | CH₃ | O | CH₃ | CH₃ | 1.589 |
| 94 | 3-NO₂ | H | CH₃ | O | CH₃ | CH₃ | 132.5-133.5 |
| 95 | 2-OH | H | CH₃ | O | H | t-C₄H₉ | 151.5-152.5 |
| 96 | CH₃NHCO₂ | H | CH₃ | O | H | t-C₄H₉ | 142.0-143.5 |
| 97 | C₂H₅NHCO₂ | H | CH₃ | O | H | t-C₄H₉ | 131.5-133.5 |
| 98 | n-C₄H₉NHCO₂ | H | CH₃ | O | H | t-C₄H₉ | 93.0-94.5 |
| 99 | CH₃NHCO₂ | H | CH₃ | O | H | CH₃ | 183-185 |
| 100 | C₂H₅NHCO₂ | H | CH₃ | O | H | C₂H₅ | 142.0-144.5 |
| 101 | n-C₃H₇NHCO₂ | H | CH₃ | O | H | n-C₃H₇ | 103.5-104.5 |
| 102 | n-C₄H₉NHCO₂ | H | CH₃ | O | H | n-C₄H₉ | 104.5-106.0 |
| 103 | 4-CH₃ | H | CH₃ | O | C₂H₅ | C₂H₅ | 61.5-64.5 |
| 104 | 4-Cl | H | CH₃ | O | C₂H₅ | C₂H₅ | 76.0-77.5 |
| 105 | 2-Cl | H | CH₃ | O | C₂H₅ | C₂H₅ | 1.5798 |
| 106 | 2,6-Cl | H | CH₃ | O | C₂H₅ | C₂H₅ | 1.5737 |
| 107 | 3,4-Cl | H | CH₃ | O | C₂H₅ | C₂H₅ | 1.596 |
| 108 | 2,4-Cl | H | CH₃ | O | C₂H₅ | C₂H₅ | 1.5926 |
| 109 | 2-CH₃O | H | CH₃ | O | C₂H₅ | C₂H₅ | 62.5-64.5 |
| 110 | 4-CH₃O | H | CH₃ | O | C₂H₅ | C₂H₅ | 1.5784 |
| 111 | 3,4-CH₃O | H | CH₃ | O | C₂H₅ | C₂H₅ | 70.5-72.5 |
| 112 | 2,5-CH₃O | H | CH₃ | O | C₂H₅ | C₂H₅ | 78.5-80.0 |
| 113 | 4-(CH₃)₃N⁺I⁻ | H | CH₃ | O | C₂H₅ | C₂H₅ | 104.5-106.5 |
| 114 | 4-(CH₃)₃N⁺I⁻ | H | CH₃ | O | C₂H₅ | C₂H₅ | 156.5-157.0 |
| 115 | 3-NO₂ | H | CH₃ | O | C₂H₅ | C₂H₅ | 78-80 |
| 116 | 2-Cl | H | n-C₃H₇ | O | H | i-C₃H₇ | 94.0-99.5 |
| 117 | 2-Cl | H | n-C₃H₇ | O | H | n-C₃H₇ | 52.5-58.5 |
| 118 | 2-Cl | H | n-C₃H₇ | O | H | t-C₄H₉ | 1.5714 |
| 119 | 2-Cl | H | n-C₃H₇ | O | H | n-C₄H₉ | 1.571 |
| 120 | 2-Cl | H | CH₃ | O | H | i-C₄H₉ | 98.0-100.5 |
| 121 | 2-Cl | H | CH₃ | O | H | sec-C₄H₉ | 96.0-97.0 |
| 122 | 2-Cl | H | CH₃ | O | H | n-C₅H₁₁ | 81.0-82.5 |
| 123 | 2-Cl | H | CH₃ | O | H | 2'-pentyl | 93-94 |
| 124 | 2-Cl | H | CH₃ | O | H | 3'-pentyl | 100.5-103.0 |
| 125 | 2-Cl | H | CH₃ | O | H | 4'-methylpent-2'-yl | 90-91 |
| 126 | 2-Cl | H | CH₃ | O | H | 3,3'-dimethylbut-2'-yl | 108.5-111 |
| 127 | 2-Cl | H | CH₃ | O | H | Isoamyl | 93.0-95.5 |
| 128 | 2-Cl | H | CH₃ | O | H | 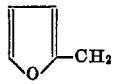 furyl-CH₂ | 150-152 |
| 129 | 2-Cl | H | CH₃ | O | H | 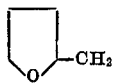 tetrahydrofuryl-CH₂ | 95.5-96.5 |
| 130 | 2-Cl | H | CH₃ | O | H | 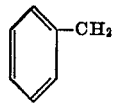 benzyl | 119.5-122.0 |
| 131 | 2-Cl | H | CH₃ | O | H | n-Hexyl | 87.5-89.0 |
| 132 | 2-Cl | H | CH₃ | O | | 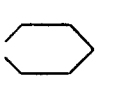 cyclohexyl | 110-111 |
| 133 | 2-Cl | H | CH₃ | O | | 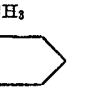 methylcyclohexyl | 103.5-105.0 |
| 134 | 2-Cl | H | CH₃ | O | n-C₃H₇ | n-C₃H₇ | 1.5645 |
| 135 | 2-Cl | H | CH₃ | O | CH(CH₃)₂ | CH(CH₃)₂ | 103.5-105.0 |
| 136 | 2-Cl | H | CH₃ | O | C₂H₅ | n-C₄H₉ | 1.5653 |
| 137 | 2-Cl | H | CH₃ | O | n-C₄H₉ | n-C₄H₉ | 1.5532 |
| 138 | 2-Cl | H | CH₃ | O | i-C₄H₉ | i-C₄H₉ | 1.5476 |

TABLE I—Continued

| Compound Number | $X_n$ | R | $R^1$ | Z | $R^2$ | $R^3$ | M.P.(° C.) $n_D^{30}$ |
|---|---|---|---|---|---|---|---|
| 139 | 2-Cl | H | CH₃ | O | CH₃ | 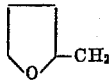 | 1.583 |
| 140 | 2-Cl | H | CH₃ | O | i-C₄H₉ | CH₂=CHCH₂ | 1.5643 |
| 141 | 2-Cl | H | CH₃ | O | H | CH₃OCH₂CH₂CH₂ | 68.0-69.5 |
| 142 | 2-Cl | H | CH₃ | O | | 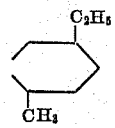 | 1.576 |
| 143 | 2-Cl | H | CH₃ | O | C₂H₅ | 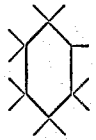 | 1.579 |
| 144 | 2-Cl | H | C₂H₅ | O | H | i-C₃H₇ | 125.0-127.0 |
| 145 | 2-Cl | H | C₂H₅ | O | H | n-C₃H₇ | 76.5-77.5 |
| 146 | 2-Cl | H | C₂H₅ | O | H | n-C₄H₉ | 53-56 |
| 147 | 2-Cl | H | C₂H₅ | O | H | t-C₄H₉ | 87.5-89.0 |
| 148 | 2-Cl | H | CH₃ | O | CH₂=CHCH₂ | CH₂=C(Cl)CH₂ | 1.5874 |
| 149 | 2-Cl | H | i-C₃H₇ | O | H | n-C₃H₇ | 1.567 |
| 150 | 2,6-Cl | H | CH₃ | O | H | CH₃ | 78-81 |
| 151 | 2,6-Cl | H | CH₃ | O | H | C₂H₅ | 67-69 |
| 152 | 2,6-Cl | H | CH₃ | O | H | n-C₃H₇ | 49.0-51.5 |
| 153 | 2-Cl | H | i-C₃H₇ | O | H | i-C₃H₇ | 85.5-87.5 |
| 154 | 2-Cl | H | i-C₃H₇ | O | H | t-C₄H₉ | 1.5530 |
| 155 | 2-Cl | H | i-C₃H₇ | O | H | n-C₄H₉ | 59.5-61.5 |
| 156 | 4-CH₃ | CH₃ | CH₃ | O | H | t-C₄H₉ | 97.5-100.0 |
| 157 | 3-Cl | CH₃ | CH₃ | O | H | t-C₄H₉ | 1.5517 |
| 158 | 4-Cl | CH₃ | CH₃ | O | H | t-C₄H₉ | 73.5-75.5 |
| 159 | 4-NO₂ | CH₃ | CH₃ | O | H | t-C₄H₉ | 119.0-120.5 |
| 160 | 3-NO₂ | CH₃ | CH₃ | O | H | t-C₄H₉ | 106.5-108.0 |
| 161 | H | CH₃ | CH₃ | O | H | t-C₄H₉ | 108.5-110.0 |
| 162 | H | CH₃ | H | O | H | t-C₄H₉ | 141.5-145.5 |
| 163 | 3-NO₂ | CH₃ | CH₃ | O | H | t-C₄H₉ | 227-228 |
| 164 | H | C₂H₅ | H | O | H | t-C₄H₉ | 174.0-175.5 |
| 165 | H | CH₃ | CH₃ | O | H | t-C₃H₇ | 1.5538 |
| 166 | 4-CH₃O | CH₃ | CH₃ | O | H | i-C₃H₇ | 1.5604 |
| 167 | 4-CH₃ | CH₃ | CH₃ | O | H | i-C₃H₇ | 1.5507 |
| 168 | 2,6-Cl | H | CH₃ | S | H | n-C₄H₉ | 79.5-82.0 |
| 169 | 3-NO₂ | H | CH₃ | S | H | n-C₄H₉ | 120.5-121.5 |
| 170 | H | H | CH₃ | S | H | n-C₄H₉ | 71.0-72.5 |
| 171 | 4-NO₂ | H | CH₃ | S | H | n-C₄H₉ | 167.5-169.5 |
| 172 | 3,4-OC₂H₅ | H | CH₃ | S | H | n-C₄H₉ | 1.621 |
| 173 | 2-Cl | H | CH₃ | S | H | n-C₄H₉ | 80.5-82.0 |

ᵃ Viscous liquid.

Other examples of compounds falling within the generic formula presented herein, which are preparable by the aforedescribed procedures and which may be formulated into herbicidal compositions and applied as herein illustrated are:

| $X_n$ | R | $R^1$ | Z | $R^2$ | $R^3$ |
|---|---|---|---|---|---|
| 4-CH₃ | H | CH₃ | S | H | CH₃ |
| 4-OCH₃ | H | CH₃ | S | H | C₂H₅ |
| 2-Br | H | CH₃ | S | H | n-C₃H₇ |
| 2-Cl | H | C₂H₅ | S | CH₃ | CH₃ |
| 3,4-OCH₃ | H | n-C₃H₇ | S | C₂H₅ | C₂H₅ |
| 4-N(CH₃)₂ | H | n-C₄H₉ | S | H | i-C₃H₇ |
| 2-Cl | H | CH₃ | S | H | CH₂=CHCH₂ |
| 2,4-Cl | H | CH₃ | S | n-C₃H₇ | n-C₃H₇ |
| 3-NO₂ | H | CH₃ | S | CH₃ | CH₃ |

Herbicidal screening tests

As previously mentioned, the herein described compounds produced in the above-described manner are phytotoxic compounds which are useful and valuable in controlling various plant species. Compounds of this invention are tested as herbicides in the following manner.

Pre-emergence herbicide test.—On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1% Tween 20® (polyoxyethylene sorbitan monolaurate). The following day each flat is sprayed at the rate of 20 pounds of the candidate compound per 80 gallons of solution per acre. An atomizer is used to spray the solution onto the soil surface. The flats are placed in a greenhouse at 80° F. and watered regularly. Two weeks later the degree of weed control is determined by comparing the amount of germination and growth of each weed in the treated flats with weeds in several untreated control flats. The rating system is as follows:

— = no significant injury (0–15 percent control)
+ = slight injury (25–35 percent control)
++ = moderate injury (55–65 percent control)
+++ = severe injury or death (85–100 percent control)

An activity index is used to represent the total activity on all seven weed species. It is the sum of the number of plus marks, so that an activity index of 21 represents complete control of all seven weeds. The results of this test are reported in Table II.

Post-emergence herbicide test.—Seeds of five weed species including hairy crabgrass, watergrass, California red oats, Indian mustard, and curly dock and one crop, pinto beans (*Phaseolus vulgaris*), are planted in flats as described above for pre-emergence screening. The flats are placed in the greenhouse at 72–85° F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20® (polyoxyethylene sorbitan monolaurate) and then adding 5 ml. of water. The solution is sprayed on the foliage using an atomizer. The spray concentration is 0.5% and the rate would be approximately 20 lb./acre if all of the spray were retained on the plant and the soil, but some spray is lost so it is estimated that the application rate is approximately 12.5 lb./acre.

Beans are used to detect defoliants and plant growth regulators. The beams are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence test where (−), (+), (++), and (+++) are used for the different rates of injury and control. The injury symptoms are also recorded. The maximum activity index for complete control of all the species in the post-emergence screening test is 18 which represents the sum of the plus marks obtained with the six plant species used in the test. The herbicide activity index is shown in Table II.

TABLE II
[Herbicidal activity screening results]

| Compound Number | Herbicidal activity index[a] | |
|---|---|---|
| | Pre-emergence (20 lb./a.) | Post-emergence (12.5 lb./a.) |
| 1 | 5 | 7 |
| 2 | 7 | 4 |
| 3 | 10 | 16 |
| 4 | 2 | 10 |
| 5 | 1 | 1 |
| 6 | 4 | 3 |
| 7 | 6 | 7 |
| 8 | 13 | 16 |
| 9 | 5 | 12 |
| 10 | 16 | 10 |
| 11 | 2 | 7 |
| 12 | 3 | 1 |
| 13 | 0 | 2 |
| 14 | 9 | 16 |
| 15 | 7 | 16 |
| 16 | 2 | 12 |
| 17 | 0 | 3 |
| 18 | 3 | 12 |
| 19 | 0 | 5 |
| 20 | 5 | 8 |
| 21 | 2 | 6 |
| 22 | 2 | 2 |
| 23 | 0 | 3 |
| 24 | 2 | 8 |
| 25 | 3 | 16 |
| 26 | 4 | 14 |
| 27 | 2 | 5 |
| 28 | 2 | 7 |
| 29 | 3 | 16 |
| 30 | 0 | 6 |
| 31 | 0 | 6 |
| 32 | 0 | 4 |
| 33 | 0 | 2 |
| 34 | 0 | 4 |
| 35 | 10 | 18 |
| 36 | 7 | 15 |
| 37 | 5 | 11 |
| 38 | 21 | 17 |
| 39 | 9 | 7 |
| 40 | 8 | 4 |
| 41 | 10 | 10 |
| 42 | 7 | 15 |
| 43 | 8 | 8 |
| 44 | 3 | 13 |
| 45 | 0 | 2 |
| 46 | 0 | 5 |
| 47 | 0 | 15 |
| 48 | 0 | 4 |
| 49 | 0 | 4 |
| 50 | 4 | 16 |
| 51 | 4 | 16 |
| 52 | 0 | 6 |
| 53 | 0 | 8 |
| 54 | 0 | 4 |
| 55 | 0 | 3 |
| 56 | 0 | 3 |
| 57 | 0 | 4 |
| 58 | 0 | 7 |
| 59 | 0 | 7 |
| 60 | 0 | 8 |
| 61 | 0 | 15 |
| 62 | 0 | 4 |
| 63 | 0 | 5 |
| 64 | 0 | 5 |
| 65 | 2 | 7 |
| 66 | 6 | 5 |
| 67 | 0 | 3 |
| 68 | 12 | 15 |
| 69 | 0 | 8 |
| 70 | 14 | 15 |
| 71 | 11 | 8 |
| 72 | 11 | 14 |
| 73 | 4 | 9 |
| 74 | 0 | 1 |
| 75 | 12 | 15 |
| 76 | 0 | 7 |
| 77 | 0 | 11 |
| 78 | 8 | 17 |
| 79 | 14 | 13 |
| 80 | 4 | 8 |
| 81 | 21 | 18 |
| 82 | 11 | 12 |
| 83 | 0 | 3 |
| 84 | 1 | 8 |
| 85 | 0 | 8 |
| 86 | 10 | 11 |
| 87 | 11 | 9 |
| 88 | 2 | 6 |
| 89 | 7 | 10 |
| 90 | 0 | 9 |
| 91 | 0 | 7 |
| 92 | 0 | 5 |
| 93 | 0 | 6 |
| 94 | 2 | 4 |
| 95 | 0 | 2 |
| 96 | 1 | 3 |
| 97 | 2 | 1 |
| 98 | 0 | 1 |
| 99 | 0 | 4 |
| 100 | 2 | 4 |
| 101 | 5 | 7 |
| 102 | 3 | 0 |
| 103 | 0 | 13 |
| 104 | 0 | 10 |
| 105 | 12 | 16 |
| 106 | 8 | 13 |
| 107 | 0 | 10 |
| 108 | 5 | 11 |
| 109 | 2 | 7 |
| 110 | 0 | 9 |
| 111 | 2 | 6 |
| 112 | 0 | 7 |
| 113 | 0 | 1 |
| 114 | 6 | 13 |
| 115 | 3 | 4 |
| 116 | 4 | 7 |
| 117 | 8 | 7 |
| 118 | 3 | 5 |
| 119 | 0 | 6 |
| 120 | 2 | 6 |
| 121 | 15 | 15 |
| 122 | 4 | 9 |
| 123 | 16 | 15 |
| 124 | 12 | 9 |
| 125 | 8 | 8 |
| 126 | 8 | 5 |
| 127 | 9 | 5 |
| 128 | 0 | 1 |
| 129 | 7 | 10 |
| 130 | 4 | 1 |
| 131 | 0 | 7 |
| 132 | 5 | 7 |
| 133 | 0 | 11 |
| 134 | 3 | 11 |
| 135 | 15 | 3 |
| 136 | 15 | 15 |
| 137 | 0 | 6 |
| 138 | 3 | 6 |
| 139 | 6 | 10 |
| 140 | 0 | 11 |
| 141 | 10 | 16 |
| 142 | 0 | 7 |
| 143 | 6 | 4 |
| 144 | 12 | 11 |
| 145 | 16 | 10 |
| 146 | 18 | 11 |
| 147 | 14 | 11 |
| 148 | 0 | 4 |
| 149 | 3 | 9 |
| 150 | 1 | 11 |
| 151 | 0 | 12 |
| 152 | 6 | 9 |
| 153 | 0 | 6 |
| 154 | 0 | 7 |
| 155 | 1 | 4 |
| 156 | 0 | 4 |
| 157 | 0 | 4 |
| 158 | 2 | 6 |
| 159 | 2 | 10 |
| 160 | 2 | 7 |
| 161 | 0 | 7 |

See footnote at end of table.

TABLE II—Continued
[Herbicidal activity screening results]

| Compound Number | Herbicidal activity index[a] | |
|---|---|---|
| | Pre-emergence (20 lb./a.) | Post-emergence (12.5 lb./a.) |
| 162 | 9 | 12 |
| 163 | 0 | 1 |
| 164 | 0 | 4 |
| 165 | 0 | 2 |
| 166 | 0 | 2 |
| 167 | 0 | 7 |

[a] 21=85-100% control of all seven plant species tested pre-emergence; 18=85-100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre.

The phytotoxic compositions of this invention are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least ½-inch below the soil surface. It is not necessary that the phytotoxic compositions can be applied merely by spraying or sprinkling the surface of the soil. The phytotoxic compositions of this invention can also be applied by addition to irrigation water supplied to the field to be treated. This method of application permits the penetration of the compositions, into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments for example, fertilizers, pesticides and the like, used as adjuvant or in combination with any of the above-described adjuvants. Other phytotoxic compounds useful in combination with the above-described compounds include for example, 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis-(3-methoxypropylamino)-6-methylthio-S-triazine; 2-chloro-4-ethylamino-6-isopropylamino-S-triazine, and 2-ethylamino-4-isopropylamino-6-methylmercapto - S - triazine,, urea derivatives, such as 3-(3,4-dichlorophenyl)-1,1-dimethyl urea and 3-(p-chlorophenyl)-1,1-dimethyl urea and acetamides such as N,N-diallyl-α-chloroacetamide, N-(α-chloroacetyl)hexamethylene imine, and N,N-diethyl-a-bromacet-amide, and the like; benzoic acids such as 3-amino-2,5-dichlorobenzoic; and thiocarbamates, such as S-propyl dipropylthiocarbamate; S-ethyl-dipropylthiocarbamate, S-ethylcyclohexyl-ethyl-thiocarbamate, S-ethyl hexahydro-1H-azepine-1-carbothioate and the like. Fertilizers useful in combination with the active ingredients include for example, ammonium nitrate, urea and superphosphate. Other useful additaments include materials in which plant organisms take root and grow such as compost, manure, humus, sand and the like.

The concentration of a compound of the present invention, constituting an effective amount in the best mode of administration in the utility disclosed is readily determinable by those skilled in the art.

Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound having the formula:

$$\underset{X_{[n]}}{\underset{\text{}}{\bigcirc}}-\overset{R}{\underset{|}{C}}=\overset{R^1}{\underset{|}{N}}-N-\overset{Z}{\underset{||}{C}}-N\overset{R^2}{\underset{R^3}{<}}$$

in which
Z is oxygen;
X is N-lower alkylcarbamoyloxy, or N-allylcarbamoyloxy;
R is hydrogen;
$R^1$ is hydrogen or lower alkyl;
$R^2$ is hydrogen, or lower alkyl; and
$R^3$ is hydrogen, or lower alkyl.

2. A compound according to claim 1 in which X is N-lower alkylcarbamoyloxy, $R^1$ is lower alkyl, $R^2$ is hydrogen, and $R^3$ is lower alkyl.

3. A compound according to claim 2 in which X is 3-(N-methylcarbamoyloxy), $R^1$ is methyl and $R^3$ is t-butyl.

4. A compound according to claim 2 in which X is 3-(N-ethylcarbamoyloxy), $R^1$ is methyl and $R^3$ is t-butyl.

5. A compound according to claim 2 in which X is 3-(N-n-butylcarbamoyloxy), $R^1$ is methyl and $R^3$ is t-butyl.

6. A compound according to claim 1 in which X is 3-N-allylcarbamoyloxy, $R^1$ is hydrogen, $R^2$ is hydrogen, $R^3$ is lower alkyl.

7. A compound according to claim 6 in which $R^3$ is tertiary-butyl.

References Cited

UNITED STATES PATENTS

| 3,182,082 | 5/1965 | Sydor | 260—552 |
| 3,419,659 | 12/1968 | Catino et al. | 424—60 |

FOREIGN PATENTS

| 1,534,547 | 7/1968 | France | 260—554 |

JAMES A. PATTEN, Primary Examiner

U.S. Cl. X.R.

71—87, 88, 94, 95, 99, 105, 106, 119, 120; 260—239 B, 239 BF, 240 A, 240 G, 293.72, 293.73, 293.74, 293.75, 293.76, 293.79, 293.83, 293.84, 326.3, 347.2, 347.3, 347.4, 465 D, 552 R, 552 SC, 554, 938